United States Patent
McKelvey et al.

(10) Patent No.: US 7,093,443 B2
(45) Date of Patent: Aug. 22, 2006

(54) GAS TURBINE APPARATUS

(75) Inventors: Terence McKelvey, Tokyo (JP); Eishi Marui, Tokyo (JP); Masahiro Miyamoto, Tokyo (JP); Tadashi Kataoka, Tokyo (JP); Tai Furuya, Tokyo (JP)

(73) Assignee: Ebara Corporation, Tokyo (JP)

( * ) Notice: Subject to any disclaimer, the term of this patent is extended or adjusted under 35 U.S.C. 154(b) by 156 days.

(21) Appl. No.: 10/733,244

(22) Filed: Dec. 12, 2003

(65) Prior Publication Data

US 2004/0119293 A1 Jun. 24, 2004

(30) Foreign Application Priority Data

Dec. 12, 2002 (JP) ............................. 2002-361312

(51) Int. Cl.
*F02C 9/28* (2006.01)
(52) U.S. Cl. ..................................... 60/773; 60/39.281
(58) Field of Classification Search ............... 60/39.24, 60/39.281, 773
See application file for complete search history.

(56) References Cited

U.S. PATENT DOCUMENTS 4,188,781 A * 2/1980 Johnson et al. .......... 60/39.281
4,922,710 A * 5/1990 Rowen et al. ........... 60/39.281
2002/0063479 A1 * 5/2002 Mitchell et al. ............ 307/153

FOREIGN PATENT DOCUMENTS

JP 2002-129985 5/2002

* cited by examiner

*Primary Examiner*—Louis J. Casaregola
(74) *Attorney, Agent, or Firm*—Oblon, Spivak, McClelland, Maier & Neustadt, P.C.

(57) ABSTRACT

A gas turbine apparatus has a combustor 2 for combusting fuel to produce a combustion gas, a turbine 1 which is rotated by the combustion gas, an electric generator 5 coupled to the turbine 1, and a fuel flow control valve 10 configured to change an opening thereof The gas turbine apparatus includes a first PID processing unit 16 to adjust the opening of the fuel flow control valve 10 so as to maintain a rotational speed of the turbine 1 substantially at a constant value, and a second PID processing unit 17 to adjust the opening of the fuel flow control valve 10 so as to maintain a temperature of a discharged combustion gas at temperatures lower than a predetermined temperature. The gas turbine apparatus has an electric power controller 21 to control electric power to be generated by the electric generator 5 based on output values of the first PID processing unit 16 and the second PID processing unit 17.

19 Claims, 5 Drawing Sheets

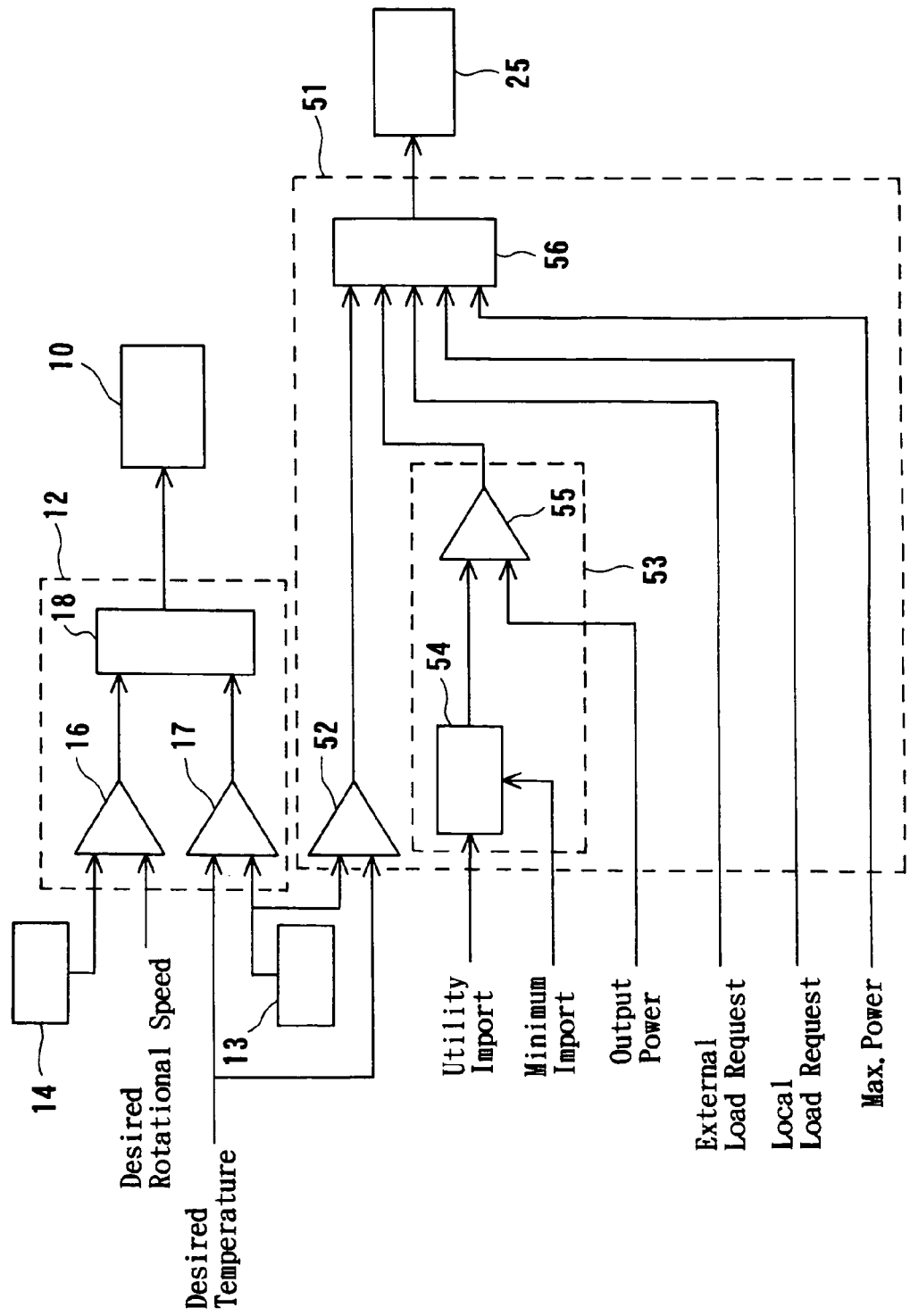

GAS TURBINE APPARATUS

BACKGROUND OF THE INVENTION

1. Field of the Invention

The present invention relates to a gas turbine apparatus, and more particularly to a gas turbine apparatus having a control system for controlling electric power generated by an electric generator based on the temperature of a discharged combustion gas. The present invention also relates to a method of controlling electric power generated by an electric generator in a gas turbine apparatus.

2. Description of the Related Art

Generally, a gas turbine apparatus has a turbine which is rotated by a fluid applied to the turbine, a combustor for combusting a mixture of fuel and air, a fuel flow control valve for adjusting the amount of fuel to be supplied to the combustor, and an air compressor for compressing air and supplying the compressed air to the combustor. The combustor produces a combustion gas having a high temperature and a high pressure when the mixture of fuel and air is combusted in the combustor. The combustion gas is supplied to the turbine to rotate the turbine at a high rotational speed.

The gas turbine apparatus has a PID processing unit for controlling the rotational speed of the turbine. The PID processing unit adjusts the amount of fuel to be supplied through the fuel flow control valve to the combustor to rotate the turbine at a constant rotational speed. In order to bring the present rotational speed into a desired rotational speed, the PID processing unit performs a feedback control process. Specifically, the rotational speed of the turbine is fed back to the PID processing unit, which calculates an optimal amount of fuel to be supplied to the combustor so as to minimize a deviation between the present rotational speed and the desired rotational speed. The PID processing unit calculates the amount of fuel to be supplied according to a PID control process.

A PID control process is employed to bring the present value of a controlled system into a predetermined set point. In such a PID control process, a manipulated variable (control output value) to eliminate a deviation between the present value and the set point is calculated based on a proportional action, an integral action, and a derivative action. Thus, "PID" stands for a combination of the initials of the proportional action, the integral action, and the derivative action. According to a PID control process, a system can be controlled by a combination of a proportional action corresponding to a magnitude of a deviation, an integral action corresponding to a period of time for which the deviation continues, and a derivative action corresponding to a change in the deviation.

Generally, when a gas turbine apparatus starts to operate, a large amount of fuel is supplied to a combustor in order to rapidly increase the rotational speed of a turbine to a rated rotational speed. Accordingly, a mixture of fuel and air is vigorously combusted. A combustion gas produced by the combustor directly affects the temperature of the gas turbine apparatus, particularly the temperatures of the combustor and a regenerator (heat exchanger) provided near a discharge port of the turbine. Thus, the temperature of the gas turbine apparatus may excessively be increased when the gas turbine apparatus starts to operate. Therefore, the gas turbine apparatus has a PID processing unit for controlling the amount of fuel to be supplied so that the temperature of the discharged combustion gas is maintained at temperatures lower than a predetermined temperature. The PID processing unit is arranged to operate after the mixture of fuel and air is ignited until the rotational speed of the turbine reaches the rated rotational speed.

There has been known a gas turbine apparatus having an electric generator coupled to a rotational shaft of a turbine so that the electric generator is driven by the turbine to generate electric power. Generally, the amount of fuel to be supplied should be increased in order to increase electric power generated by the electric generator. In such a case, the temperature of the gas turbine apparatus is also increased. In order to prevent the temperature of the gas turbine apparatus from being increased to an extremely high temperature, it is necessary to control electric power generated by the electric generator. The conventional gas turbine apparatus employs a dedicated control logic to control generated electric power and thus requires a complicated circuit arrangement in a control system of the apparatus.

SUMMARY OF THE INVENTION

The present invention has been made in view of the above drawbacks. It is, therefore, an object of the present invention to provide a gas turbine apparatus having a control system which can maximize generated electric power while maintaining the temperature of a discharged combustion gas at temperatures lower than a permissive temperature of the gas turbine apparatus, simplify a circuit arrangement, and have a high processing speed.

Another object of the present invention is to provide a method of controlling electric power generated by an electric generator in such a gas turbine apparatus.

In order to attain the above object, according to a first aspect of the present invention, there is provided a gas turbine apparatus having a combustor for combusting fuel to produce a combustion gas, a turbine which is rotated by the combustion gas, an electric generator coupled to the turbine, and a fuel flow control valve configured to change an opening thereof. The gas turbine apparatus includes a first processing unit operable to adjust the opening of the fuel flow control valve so as to maintain a rotational speed of the turbine substantially at a constant value. The gas turbine apparatus also includes a second processing unit operable to adjust the opening of the fuel flow control valve so as to maintain a temperature of a discharged combustion gas at temperatures lower than a predetermined temperature. At least one of the first processing unit and the second processing unit may comprise a PID processing unit, or alternatively, employ a dead band or a limit control. The gas turbine apparatus has an electric power controller operable to control electric power to be generated by the electric generator based on an output value of the first PID processing unit and an output value of the second PID processing unit.

With the above arrangement, it is possible to maximize generated electric power while maintaining the temperature of the discharged combustion gas at temperatures lower than a permissive temperature of the gas turbine apparatus. Further, since the electric power controller employs the second PID processing unit, it is not necessary to provide a dedicated PID processing unit in the electric power controller. Thus, the entire control system including the electric power controller can be simplified, and a high processing speed can be achieved.

The electric power controller may have a first subtracter operable to subtract the output value of the second PID processing unit from the output value of the first PID processing unit to obtain a first calculated value. The electric power controller may also have a value converter operable to multiply the first calculated value obtained in the first subtracter by a predetermined coefficient to obtain a second calculated value. The electric power controller may have a second subtracter operable to subtract the second calculated value obtained in the value converter from a predetermined reference value. The electric power controller may further comprise a selector for sending one of load request signals to the second subtracter as the predetermined reference value.

The gas turbine apparatus may have a turbine controller operable to control the fuel flow control valve, and a selector for selecting smaller one of the output values of the first PID processing unit and the second PID processing unit and transmits it to the turbine controller.

According to a second aspect of the present invention, there is provided a gas turbine apparatus having a combustor for combusting fuel to produce a combustion gas, a turbine which is rotated by the combustion gas, an electric generator coupled to the turbine, and a fuel flow control valve configured to change an opening thereof The gas turbine apparatus includes a first processing unit operable to adjust the opening of the fuel flow control valve so as to maintain a rotational speed of the turbine substantially at a constant value. The gas turbine apparatus also includes a second processing unit operable to adjust the opening of the fuel flow control valve so as to maintain a temperature of a discharged combustion gas at temperatures lower than a predetermined temperature. At least one of the first processing unit and the second processing unit may comprise a PID processing unit, or alternatively, employ a dead band or a limit control. The gas turbine apparatus has an electric power controller operable to control electric power to be generated by the electric generator based on the temperature of the discharged combustion gas.

The electric power controller may further comprise a comparator the temperature of the discharged combustion gas to a predetermined set point to produce a load request signal, and a selector for selecting one of load request signals including the load request signal produced by the comparator.

According to a third aspect of the present invention, there is provided a method of controlling electric power generated by an electric generator in a gas turbine apparatus. Fuel is supplied through a fuel flow control valve to a combustor to produce a combustion gas. A turbine is rotated by the combustion gas. The amount of fuel to be supplied through the fuel flow control valve is adjusted so as to maintain a rotational speed of the turbine substantially at a constant value by using a first processing unit. The amount of fuel to be supplied through the fuel flow control valve is also adjusted so as to maintain a temperature of a discharged combustion gas at temperatures lower than a predetermined temperature by using a second processing unit. At least one of the first processing unit and the second processing unit may comprise a PID processing unit, or alternatively, employ a dead band or a limit control. Electric power to be generated is controlled by using the second PID processing unit.

Electric power to be generated may be controlled based on a difference between an output value of the first PID processing unit and an output value of the second PID processing unit.

The control step may be performed as follows. An output value of the second PID processing unit is subtracted from an output value of the first PID processing unit to obtain a first calculated value. The first calculated value is multiplied by a predetermined coefficient to obtain a second calculated value. The second calculated value is subtracted from a reference value.

The above and other objects, features, and advantages of the present invention will be apparent from the following description when taken in conjunction with the accompanying drawings which illustrates preferred embodiments of the present invention by way of example.

BRIEF DESCRIPTION OF THE DRAWINGS

FIG. 5 is a block diagram showing an arrangement of a turbine controller and an electric power controller according to a third embodiment of the present invention.

DETAILED DESCRIPTION OF THE PREFERRED EMBODIMENTS

A gas turbine apparatus according to embodiments of the present invention will be described below with reference to FIGS. 1 through 5.

Figure 1:
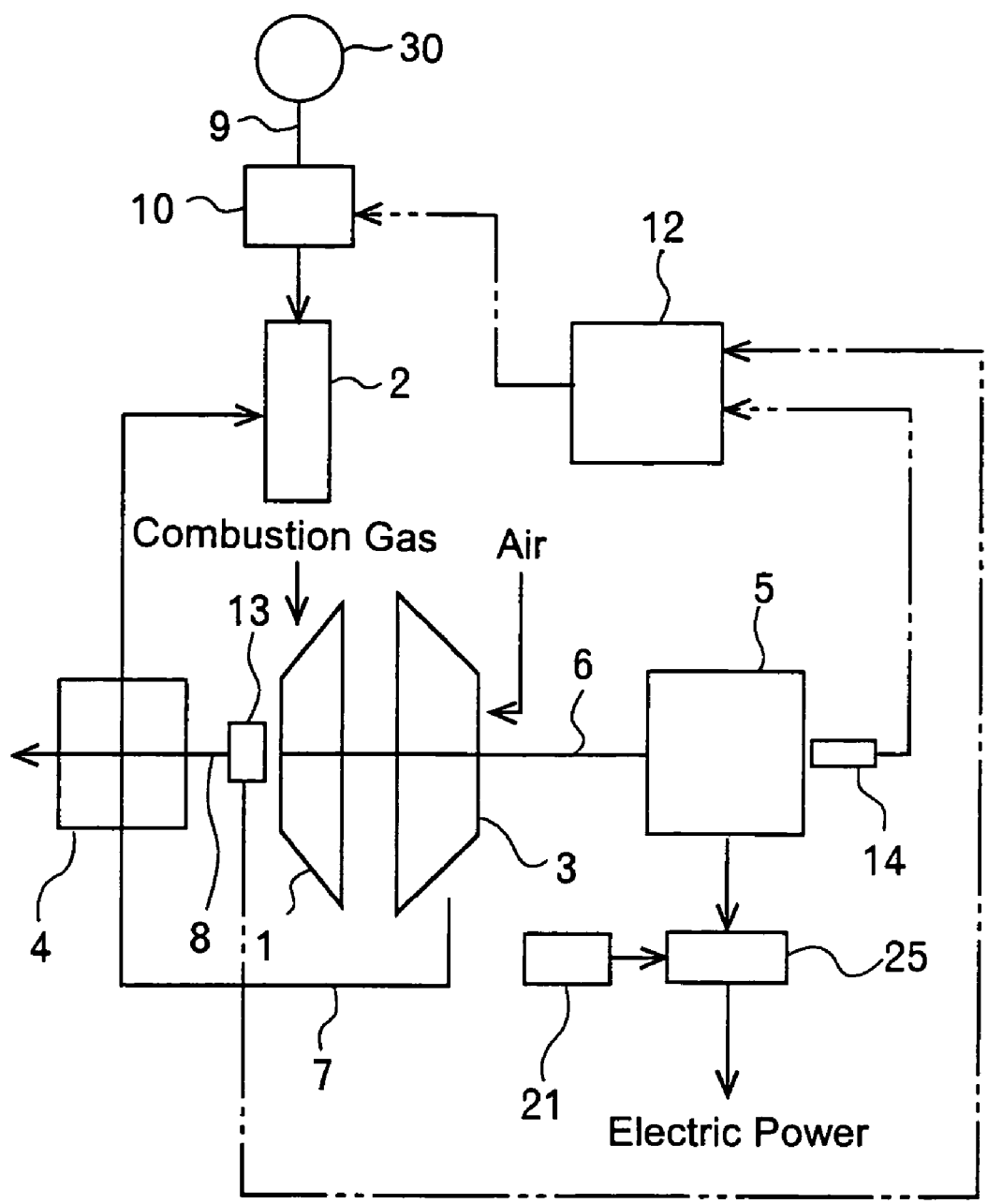
FIG. 1 is a block diagram showing an arrangement of a gas turbine apparatus according to an embodiment of the present invention.

FIG. 1 is a block diagram showing an arrangement of a gas turbine apparatus according to a first embodiment of the present invention. As shown in FIG. 1, the gas turbine apparatus has a turbine 1, a combustor 2 for combusting a mixture of fuel and air to produce a combustion gas, a fuel flow control valve 10 for adjusting the amount of fuel to be supplied to the combustor 2, and an air compressor 3 for compressing air and supplying the compressed air to the combustor 2. The gas turbine apparatus also includes an electric generator 5 coupled to the turbine 1 and a turbine controller 12 for controlling the turbine 1 as a controlled system.

The turbine 1 is housed in a casing (not shown) and fixed to a rotational shaft 6. The rotational shaft 6 is rotatably supported by bearings (not shown) and can thus be rotated together with the turbine 1. The air compressor 3 is driven via the rotational shaft 6 by the turbine 1 to compress air supplied to the air compressor 3. The air compressor 3 is connected to the combustor 2 through a pipe 7 so as to supply the compressed air through the pipe 7 to the combustor 2. The gas turbine apparatus has a heat exchanger 4 disposed on the pipe 7 for exchanging heat between the combustion gas and the air flowing through the pipe 7 to heat the air by the heat of the combustion gas.

The fuel flow control valve 10 is disposed on a pipe 9, which interconnects a fuel supply source 30 and the combustor 2. Thus, fuel is supplied from the fuel supply source 30 through the pipe 9 and the fuel flow control valve 10 to the combustor 2. The fuel flow control valve 10 is configured to change its opening so as to adjust the amount of fuel to be supplied to the combustor 2.

The fuel and the air supplied to the combustor 2 are mixed with each other to form a mixture. The mixture of the fuel and the air is combusted in the combustor 2 to produce a combustion gas having a high temperature and a high pressure. The combustion gas is supplied to the turbine 1 to rotate the turbine 1 at a high rotational speed. The combustion gas supplied to the turbine 1 is delivered through the pipe 8 to the heat exchanger 4 and then discharged from the heat exchanger 4.

The electric generator 5 is coupled to the rotational shaft 6 near an end of the rotational shaft 6. The electric generator 5 generates AC electric power when the rotational shaft 6 is rotated at a high rotational speed by the turbine 1. The gas turbine apparatus has an inverter 25 connected to the electric generator 5 and an electric power controller 21 connected to the inverter 25. The AC electric power generated by the electric generator 5 is delivered through the inverter 25 to a commercial power supply system. The electric power controller 21 sends a command, indicating electric power to be generated, to the inverter 25 and controls generated electric power via the inverter 25. The AC electric power generated by the electric generator 5 is converted into desired DC electric power by an AC/DC converter (not shown) and a booster (not shown), and the DC electric power is converted into AC electric power by the inverter 25. The AC electric power is outputted from the inverter 25 to the commercial power supply system connected to the inverter 25. In the present embodiment, the electric generator 5 comprises a DC brushless electric generator.

The gas turbine apparatus includes a temperature measuring unit 13 disposed on the pipe 8 for measuring the temperature of the discharged combustion gas and a rotational speed measuring unit 14 disposed near an end of the rotational shaft 6 for measuring the rotational speed of the turbine 1. The temperature measuring unit 13 and the rotational speed measuring unit 14 send measured values to the turbine controller 12.

Figure 2:
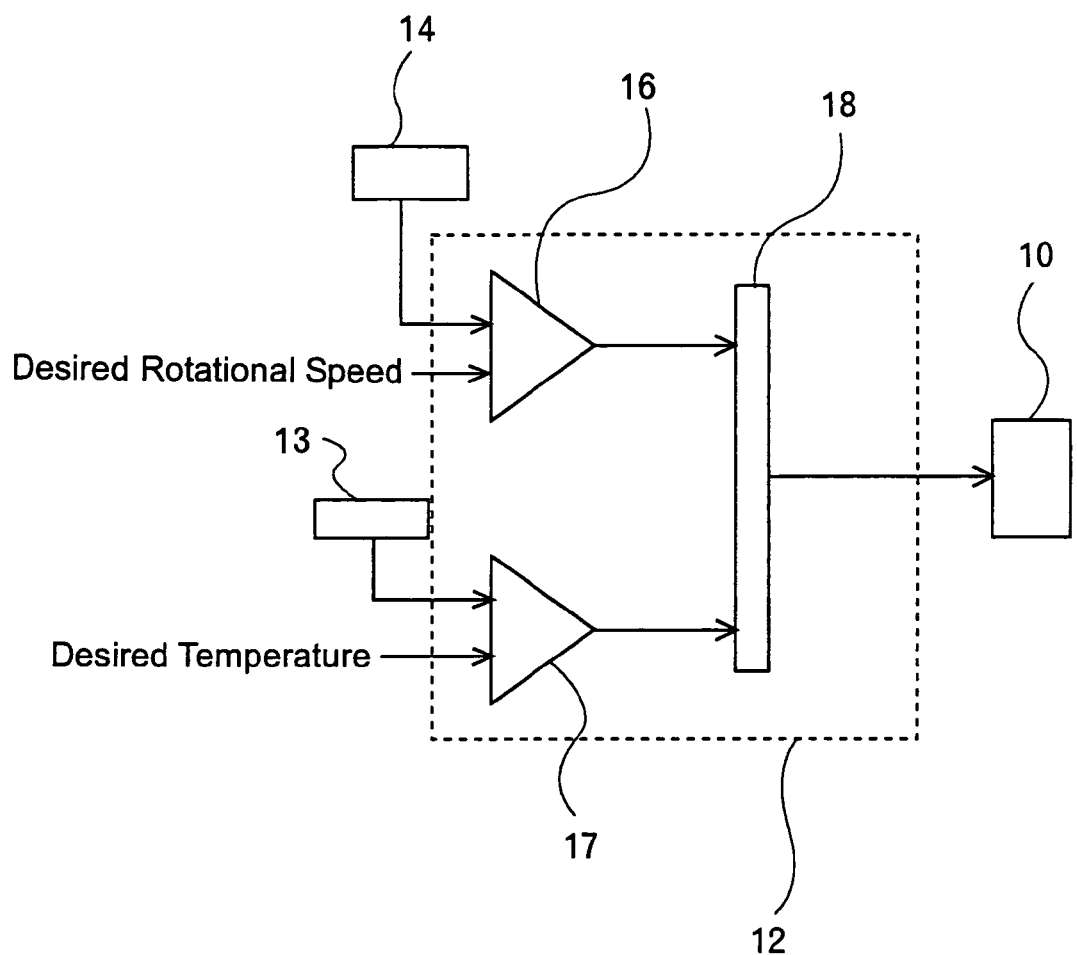
FIG. 2 is a block diagram showing a turbine controller in the gas turbine apparatus shown in FIG. 1.

FIG. 2 is a block diagram showing an arrangement of the turbine controller 12. As shown in FIG. 2, the turbine controller 12 includes a first PID processing unit 16 for controlling the rotational speed of the turbine 1, a second PID processing unit 17 for controlling the temperature of the discharged combustion gas, and a selector 18 for selecting one of signals from the PID processing units 16 and 17. The rotational speed measuring unit 14 is connected to the first PID processing unit 16. The first PID processing unit 16 calculates an optimal amount of fuel to be supplied to the combustor 2 based on a feedback value sent form the rotational speed measuring unit 14 so that the turbine 1 is rotated at a predetermined rotational speed (desired rotational speed). Specifically, the present rotational speed of the turbine 1 is measured by the rotational speed measuring unit 14 and continuously fed back to the first PID processing unit 16. The first PID processing unit 16 stores therein a rated rotational speed at which the turbine 1 should be rotated, i.e., a desired rotational speed. The desired rotational speed is predetermined. The first PID processing unit 16 calculates an optimal amount of fuel to be supplied so as to minimize a deviation between the desired rotational speed and the present rotational speed of the turbine 1.

The second PID processing unit 17 stores therein a threshold temperature which can thermally be accepted by components including the combustor 2. The threshold temperature is predetermined so as to be lower than the maximum temperature which can thermally be accepted by the combustor 2 and the heat exchanger 4. The second PID processing unit 17 calculates an optimal amount of fuel to be supplied to the combustor 2 so that the temperature of the discharged combustion gas is maintained below the threshold temperature. The temperature measuring unit 13 is connected to the second PID processing unit 17. The present temperature of the discharged combustion gas is measured by the temperature measuring unit 13 and continuously fed back to the second PID processing unit 17. The second PID processing unit 17 stores therein the aforementioned threshold temperature as a desired temperature. The second PID processing unit 17 calculates an optimal amount of fuel to be supplied to the combustor 2 so as to minimize a deviation between the desired temperature and the present temperature of the discharged combustion gas. The second PID processing unit 17 can maintain the temperature of the discharged combustion gas at temperatures lower than the threshold temperature (desired temperature) and thus prevent the components including the combustor 2 from being excessively heated.

The PID processing units 16 and 17 send output values to the selector 18, respectively. The selector 18 compares the output values sent from the PID processing units 16 and 17 with each other and passes smaller one of the output values therethrough. The output value which has been passed through the selector 18 is transmitted as a final output value of the turbine controller 12 to the fuel flow control valve 10. The fuel flow control valve 10 is operated so as to have an opening corresponding to the output value from the turbine controller 12. The amount of fuel to be supplied to the combustor 2 is thus determined.

In addition to the PID processing units 16 and 17, the gas turbine apparatus may include a third PID processing unit (not shown) for controlling a rotational acceleration of the turbine 1. The third PID processing unit controls a rotational acceleration of the turbine 1 so as to accelerate the turbine 1 while the temperature of the discharged combustion gas is maintained below a predetermined value when the gas turbine apparatus starts to operate.

Figure 3:
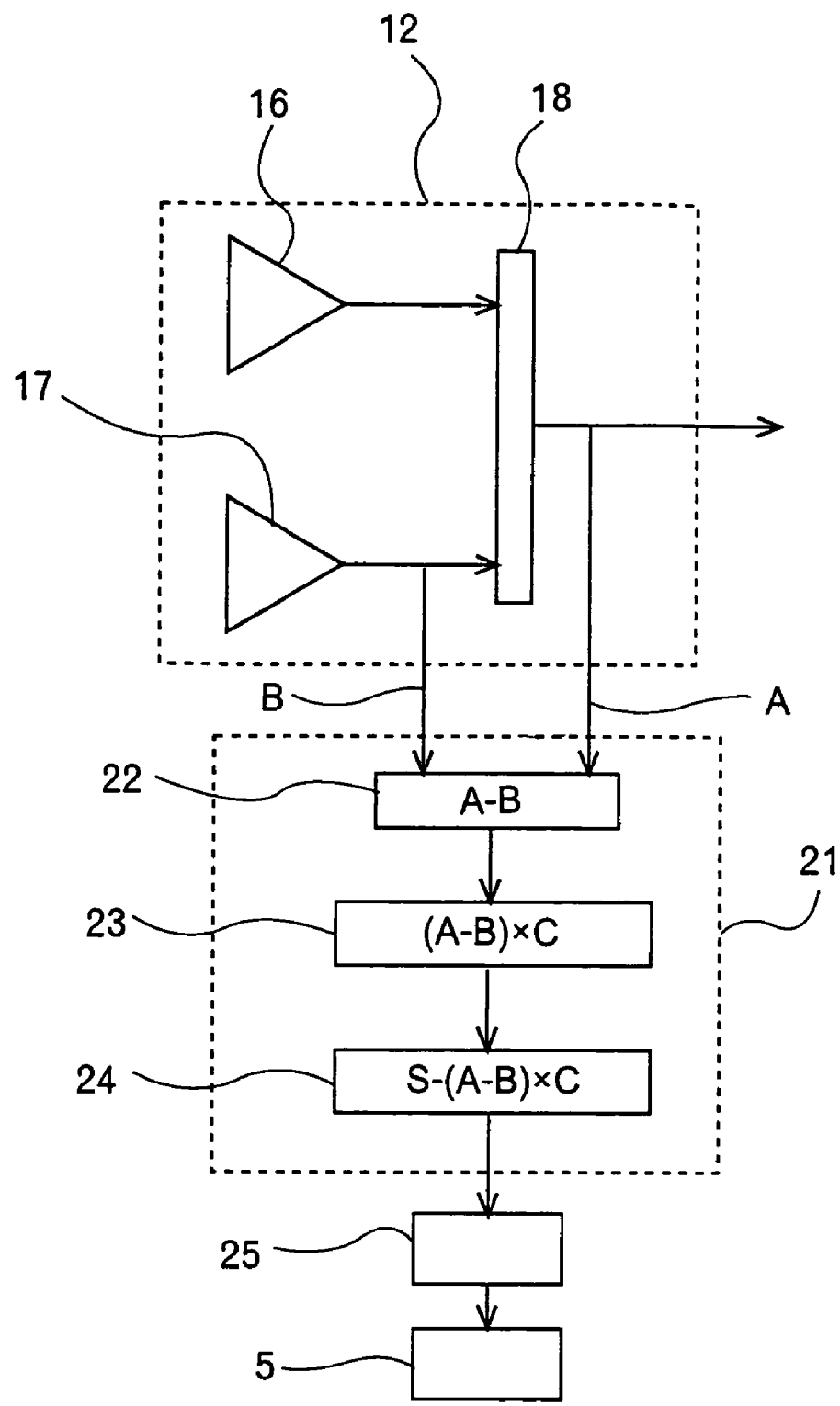
FIG. 3 is a block diagram showing the turbine controller and an electric power controller in the gas turbine apparatus shown in FIG. 1.

FIG. 3 is a block diagram showing an arrangement of the turbine controller 12 and the electric power controller 21. As shown in FIG. 3, the electric power controller 21 has a first subtracter 22 for subtracting the output value of the second PID processing unit 17 from the output value of the first PID processing unit 16, a value converter 23 for multiplying the calculated value of the first subtracter 22 by a predetermined coefficient, and a second subtracter 24 for the calculated value of the value converter 23 from a predetermined reference value.

Specifically, the output value (A) of the selector 18 and the output value (B) of the second PID processing unit 17 are transmitted to the first subtracter 22. The first subtracter 22 performs a first subtracting step of subtracting the output value (B) of the second PID processing unit 17 from the output value (A) of the selector 18. The calculated value (A−B) of the first subtracter 22 is transmitted to the value converter 23. The value converter 23 performs a value converting step of multiplying the value (A−B) of the first subtracter 22 by a predetermined coefficient (C). Then, the calculated value ((A−B)×C) of the value converter 23 is transmitted to the second subtracter 24. The second subtracter 24 stores a predetermined reference value (S) therein and performs a second subtracting step of subtracting the calculated value ((A−B)×C) from the reference value (S).

The output value of the first PID processing unit 16 and the output value of the second PID processing unit 17 are represented by percentage. The output of the electric power controller 21 is represented by a unit for electric power, i.e., kilowatt, because the electric power controller 21 serves to control electric power to be generated by the electric generator 5. Therefore, in order to use the output value of the first PID processing unit 16 and the output value of the second PID processing unit 17 to control electric power to be generated by the electric generator 5, the output values of the PID processing units 16 and 17 should be converted into a value corresponding to kilowatt. As described above, the value converter 23 multiplies a value by a predetermined coefficient to convert the output values of the PID processing units 16 and 17 into a value corresponding to the output of the electric power controller 21.

The output (kW) of the electric power controller 21 is transmitted to the inverter 25. The inverter 25 converts electric power generated by the electric generator 5 into electric power corresponding to the output of the electric power controller 21. Thus, the electric power controller 21 controls electric power to be generated by the electric generator 5 through the inverter 25.

Operation of the electric power controller 21 will be described below. When the turbine 1 is rotated at a rated rotational speed, large loads cause the temperature of the discharged combustion gas to be increased. In such a case, the second PID processing unit 17 reduces the amount of fuel to be supplied to the combustor 2 to prevent the temperature of the discharged combustion gas from being increased. Therefore, the output value (B) of the second PID processing unit 17 is lowered. On the other hand, the output value (A) of the first PID processing unit 16 is maintained substantially at the constant value because the rotational speed of the turbine 1 is maintained at a constant value. Thus, the calculated value (A−B) of the first subtracter 22 is increased as compared to a value before the temperature of the discharged combustion gas is increased. Because a value ((A−B)×C) to be subtracted from the reference value (S) by the second subtracter 24 is increased, the final output value outputted from the electric power controller 21 is lowered. As a result, electric power generated by the electric generator 5 is reduced, and a torque required to rotate the turbine 1 is also reduced. Accordingly, a smaller amount of fuel is combusted in the combustor 2, and thus the temperature of the discharged combustion gas can be lowered to a predetermined temperature.

As described above, the electric power controller 21 employs the second PID processing unit 17 in the turbine controller 12. Accordingly, it is not necessary to provide a dedicated PID processing unit in the electric power controller 21. Thus, the entire control system including the turbine controller 12 and the electric power controller 21 can be simplified, and processing loads can remarkably be reduced.

According to the present invention, electric power can be generated while the temperature of a gas turbine apparatus is prevented from being excessively increased. Further, since an output value of a PID processing unit for controlling the temperature of a discharged combustion gas is used in an electric power controller, the entire control system can be simplified, and the processing speed of the control system can be enhanced.

In the present embodiment, the first and second processing units 16 and 17 comprise a PID processing unit. However, the first and second processing units 16 and 17 may employ a dead band, a limit control, and the like.

Figure 4:
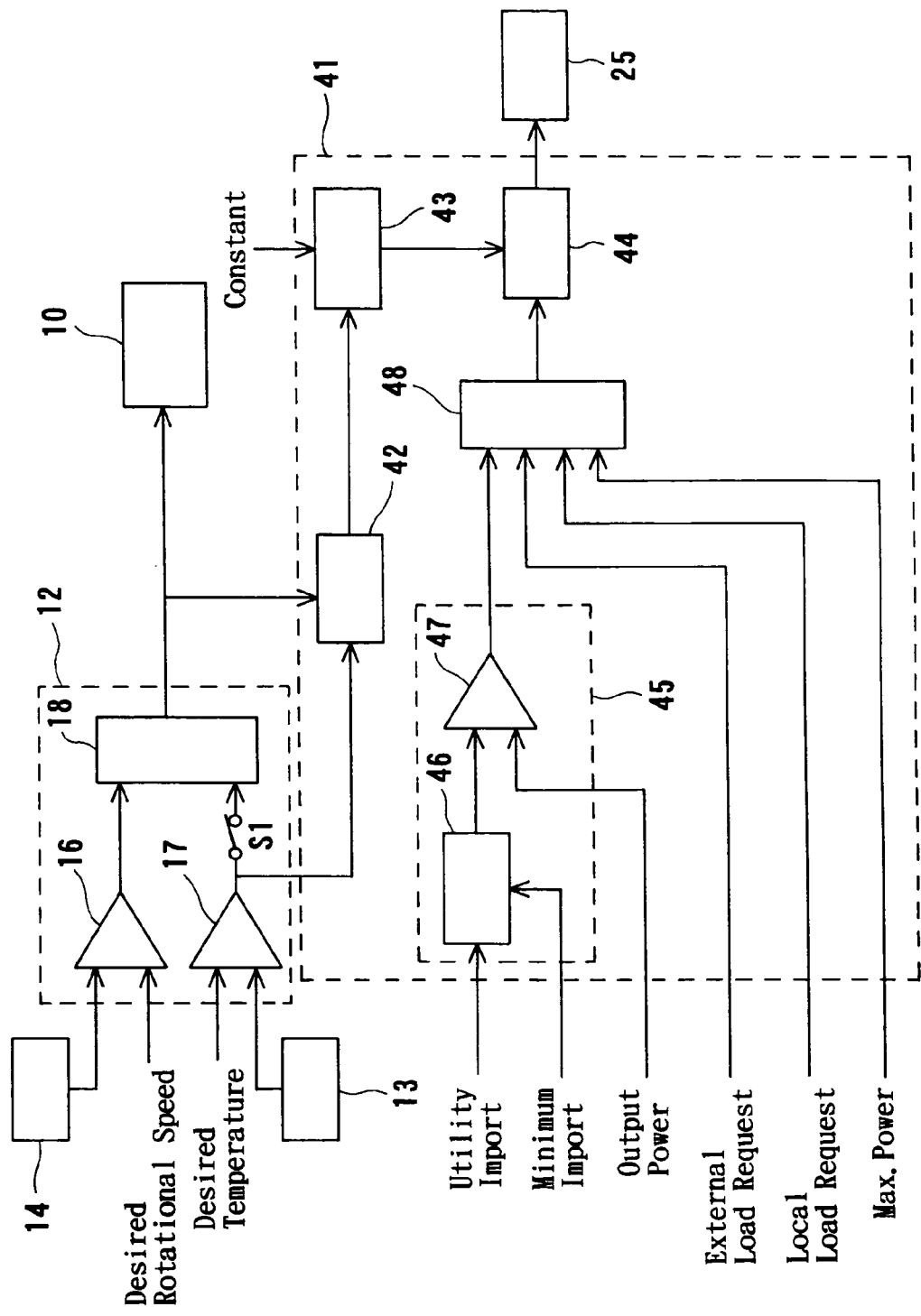
FIG. 4 is a block diagram showing an arrangement of a turbine controller and an electric power controller according to a second embodiment of the present invention.

FIG. 4 is a block diagram showing an arrangement of a turbine controller 12 and an electric power controller 41 according to a second embodiment of the present invention. In FIG. 4, like or corresponding components are designated by the same reference numerals as those in the first embodiment. As shown in FIG. 4, the turbine controller 12 has a software switch SI for switching a signal outputted from the second PID processing unit 17. The electric power controller 41 has a first subtracter 42 for subtracting the output value of the selector 18 from the output value of the second PID processing unit 17, a value converter 43 for multiplying the calculated value of the first subtracter 42 by a predetermined coefficient, and a second subtracter 44 for the calculated value of the value converter 43 from a value representing a load request.

The electric power controller 41 also includes a power export controller 45 for producing a load request signal based on a comparison of the measured power output of the individual gas turbine apparatus to a difference between the power imported from the utility and a previously determined minimum import power value. The power imported from the utility means the amount of power or energy used from the utility source. Typically, the amount of current flowing from the utility to the facility or load is used as the power imported from the utility. The minimum import power value means the amount of power to be imported from the utility as a minimum. If the import power is less than the minimum import power value, the output of the apparatus is reduced. The power export controller 45 includes a comparator 46 for comparing the power imported from the utility to a previously determined minimum import power value, and a PID controller 47 for producing a load request signal based on the output value of the comparator 46. Other load requests are also inputted into the electric power controller 41. Such load requests include an external load request, which is requested by a device external to the apparatus, a local load request, which is requested by the apparatus, and the max power value of the electric generator 5, which is a maximum power capability of the apparatus. For example, the external load request could be a customer request or a request by other means, and the local load request may come from the power request setting on a touch panel located on the apparatus. The max power value of the electric generator 5 is predetermined and cannot be changed by an operator. The load request may be generated or influenced by one or more load limiting or controlling parameters. In such a case, the electric power controller 41 determines which parameter is to control the load. One method of determining which parameter is to control the load is to choose the parameter representing the lowest load request. In the present embodiment, the electric power controller 41 has a selector 48 for selecting the smallest one of load request signals from the power export controller 45 and other sources described above.

With such an arrangement, the output value of the temperature measuring unit 13 is used to generate or modify both the fuel request during starting the gas turbine apparatus and the power output request of the electric generator 5 when running the gas turbine apparatus which is connected to a utility supply.

When the gas turbine apparatus starts to operate, the second PID processing unit 17 works in conjunction with other logics to directly control the fuel flow to prevent the components including the combustor 2 from being excessively heated. Specifically, when the gas turbine apparatus starts to operate, the software switch S1 in the turbine controller 12 is in a closed position. The signal from the temperature measuring unit 13 is compared to a set point by the second PID processing unit 17 to produce a signal for controlling the fuel control valve 10 to protect the apparatus from an excessively increased temperature.

After the turbine 1 reaches a normal operating speed, the second PID processing unit 17 is then used to control the output power of the electric generator 5. Specifically, after the turbine 1 has reached a normal operating speed, the software switch SI in the turbine controller 12 is commanded to open. Thus, the output signal of the comparison in the second PID processing unit 17 is used to de-rate the output power load request in the following manner.

First, the signal from the temperature measuring unit 13 is compared to a set point by the second PID processing unit 17. This set point can be a fixed value or variable based on one or more input parameters and may be the same or different from the set point used during starting. The difference between the output value of the second PID processing unit 17 and the current fuel flow control valve request determines the amount of de-rating required to maintain the temperature of components including the combustor 2 below its limit value. In the present embodiment, the first subtracter 42 passes only positive numbers. The value converter 43 multiplies the positive value of the difference by a known constant representing a scaling variable converting the value to a kW request deviation. The second subtracter 44 then subtracts this deviation from the load request. As described above, the load request can be generated from one or many load requests. This load request is de-rated by the electric power controller 41 prior to sending to the inverter 25.

Thus, the fuel flow and the output load are both controlled by the same PID processing unit 17. In the present embodiment, comparison of the signal from the temperature measuring unit 13 to the set point is performed by the second PID processing unit 17. However, such comparison may be performed by other types of units employing a dead band, a limit control, and the like. The first processing unit 16 may also employ a dead band, a limit control, and the like.

FIG. 5 is a block diagram showing an arrangement of a turbine controller 12 and an electric power controller 51 according to a third embodiment of the present invention. In FIG. 5, like or corresponding components are designated by the same reference numerals as those in the first embodiment. As shown in FIG. 5, the electric power controller 51 includes a comparator 52 for comparing the output value of the temperature measuring unit 13 to a desired temperature (set point) to produce a load request signal, and a power export controller 53 for producing a load request signal based on a comparison of the power output of the individual gas turbine apparatus to a difference between the power imported from the utility and a previously determined minimum import power value. Specifically, the power export controller 53 includes a comparator 54 for comparing the power imported from the utility to a previously determined minimum import power value, and a PID controller 55 for producing a load request signal based on the output value of the comparator 54. Other load requests are also inputted into the electric power controller 51. Such load requests include an external load request, a local load request, and the max power value of the electric generator 5. The load request may be generated or influenced by one or more load limiting or controlling parameters. In such a case, the electric power controller 51 determines which parameter is to control the load. One method of determining which parameter is to control the load is to choose the parameter representing the lowest load request. In the present embodiment, the electric power controller 51 has a selector 56 for selecting the smallest one of load request signals from the power export controller 53 and other sources described above. One or more parameters may influence the load after the determination by way of additional deviation.

With such an arrangement, the output value of the temperature measuring unit 13 is compared to a desired temperature (set point) by the comparator 52 to produce a load request signal. This set point can be a fixed value or variable based on one or more input parameters. The result of this comparison is used to generate or modify the power output request of the electric generator 5 when running the gas turbine apparatus which is connected to a utility supply. The comparator 52 may employ a dead band to produce digital raise and lower signals or a PID processing unit to produce a value scaled to represent a load request or load demand deviation. In the present embodiment, comparison of the signal from the temperature measuring unit 13 to the set point is performed by the second PID processing unit 17. However, such comparison may be performed by other types of units including dead band, limit control, and the like. The first processing unit 16 may also employ a dead band, a limit control, and the like.

Although certain preferred embodiments of the present invention have been shown and described in detail, it should be understood that various changes and modifications may be made therein without departing from the scope of the appended claims.

What is claimed is:

1. A gas turbine apparatus comprising:
   a combustor for combusting fuel to produce a combustion gas;
   a turbine which is rotated by the combustion gas;
   an electric generator coupled to said turbine;
   a fuel flow control valve configured to change an opening thereof;
   a first processing unit operable to adjust the opening of said fuel flow control valve so as to maintain a rotational speed of said turbine substantially at a constant value;
   a second processing unit operable to adjust the opening of said fuel flow control valve so as to maintain a temperature of a discharged combustion gas at temperatures lower than a predetermined temperature; and
   an electric power controller operable to control electric power to be generated by said electric generator based on an output value of said first processing unit and an output value of said second processing unit.

2. The gas turbine apparatus as recited in claim 1, wherein at least one of said first processing unit and said second processing unit comprises a PID processing unit.

3. The gas turbine apparatus as recited in claim 1, wherein at least one of said first processing unit and said second processing unit employs a dead band.

4. The gas turbine apparatus as recited in claim 1, wherein at least one of said first processing unit and said second processing unit employs a limit control.

5. The gas turbine apparatus as recited in claim 1, wherein said electric power controller comprises:
   a first subtracter operable to subtract the output value of said second processing unit from either a smaller one of the output values of the first processing unit and the second processing unit or the output value of said first processing unit to obtain a first calculated value;
   a value converter operable to multiply the first calculated value obtained in said first subtracter by a predetermined coefficient to obtain a second calculated value; and
   a second subtracter operable to subtract the second calculated value obtained in said value converter from a predetermined reference value.

6. The gas turbine apparatus as recited in claim 5, wherein said electric power controller further comprises a selector for sending one of load request signals including at least a calculated load request, an external load request, a local load request and a max power value of said electric generator, to said second subtracter as the predetermined reference value.

7. The gas turbine apparatus as recited in claim 1, further comprising:
a selector for selecting a smaller one of the output values of said first processing unit and said second processing unit and transmitting the smaller one of the output values to said fuel flow control valve to adjust the opening of said fuel flow control valve.

8. A gas turbine apparatus comprising:
a combustor for combusting fuel to produce a combustion gas;
a turbine which is rotated by the combustion gas;
an electric generator coupled to said turbine;
a fuel flow control valve configured to change an opening thereof;
a first processing unit operable to adjust the opening of said fuel flow control valve so as to maintain a rotational speed of said turbine substantially at a constant value;
a second processing unit operable to adjust the opening of said fuel flow control valve so as to maintain a temperature of a discharged combustion gas at temperatures lower than a predetermined temperature; and
an electric power controller operable to control electric power to be generated by said electric generator based on the temperature of the discharged combustion gas.

9. The gas turbine apparatus as recited in claim 8, wherein at least one of said first processing unit and said second processing unit comprises a PID processing unit.

10. The gas turbine apparatus as recited in claim 8, wherein at least one of said first processing unit and said second processing unit employs a dead band.

11. The gas turbine apparatus as recited in claim 8, wherein at least one of said first processing unit and said second processing unit employs a limit control.

12. The gas turbine apparatus as recited in claim 8, wherein said electric power controller further comprises a comparator for comparing the temperature of the discharged combustion gas to a predetermined set point to produce a load request signal.

13. The gas turbine apparatus as recited in claim 12, wherein said electric power controller further comprises a selector for selecting one of load request signals including at least the load request signal produced by said comparator, an external load request, a local load request and a max power value of said electric generator.

14. A method of controlling electric power generated by an electric generator in a gas turbine apparatus, said method comprising:
supplying fuel through a fuel flow control valve to a combustor to produce a combustion gas;
rotating a turbine by the combustion gas;
adjusting the amount of fuel to be supplied through the fuel flow control valve so as to maintain a rotational speed of the turbine substantially at a constant value by using a first processing unit;
adjusting the amount of fuel to be supplied through the fuel flow control valve so as to maintain a temperature of a discharged combustion gas at temperatures lower than a predetermined temperature by using a second processing unit; and
controlling electric power to be generated by using the second processing unit.

15. The method as recited in claim 14, wherein at least one of the first processing unit and the second processing unit is controlled by a PID control.

16. The method as recited in claim 14, wherein at least one of the first processing unit and the second processing unit is controlled by a dead band.

17. The method as recited in claim 14, wherein at least one of the first processing unit and the second processing unit is controlled by a limit control.

18. The method as recited in claim 14, wherein said controlling comprises controlling electric power to be generated based on a difference between an output value of the first processing unit and an output value of the second processing unit when the gas turbine apparatus starts to operate.

19. The method as recited in claim 14, wherein said controlling comprises:
subtracting an output value of the second processing unit from a smaller one of the output values of the first processing unit and the second processing unit or from an output value of the first processing unit to obtain a first calculated value;
multiplying the first calculated value by a predetermined coefficient to obtain a second calculated value; and
subtracting the second calculated value from a reference value.

* * * * *